United States Patent
Hsieh et al.

(10) Patent No.: US 8,610,999 B2
(45) Date of Patent: Dec. 17, 2013

(54) DISPLAY ELEMENT, DISPLAY APPARATUS AND FABRICATING METHOD OF THE DISPLAY ELEMENT

(75) Inventors: Chia-Ming Hsieh, Miao-Li County (TW); Jui-Jen Yueh, Miao-Li County (TW); Sheng-Chang Chen, Miao-Li County (TW); Sheng-Tien Cho, Miao-Li County (TW); Wei-Lun Liao, Miao-Li County (TW)

(73) Assignee: Chimei InnoLux Corporation, Miaoli County (TW)

( * ) Notice: Subject to any disclaimer, the term of this patent is extended or adjusted under 35 U.S.C. 154(b) by 110 days.

(21) Appl. No.: 13/116,000

(22) Filed: May 26, 2011

(65) Prior Publication Data
US 2012/0008189 A1 Jan. 12, 2012

(30) Foreign Application Priority Data
Jul. 6, 2010 (CN) .......................... 2010 1 0219010

(51) Int. Cl.
*G02B 26/00* (2006.01)
*G09G 3/34* (2006.01)

(52) U.S. Cl.
USPC .......................... 359/296; 345/107; 204/450

(58) Field of Classification Search
USPC .......... 359/238, 245, 296, 452; 345/107, 204, 345/208, 690, 691; 349/106; 204/450, 600; 400/70, 76; 445/24, 58
See application file for complete search history.

(56) References Cited

U.S. PATENT DOCUMENTS

| | | | | |
|---|---|---|---|---|
| 7,114,864 | B2* | 10/2006 | Shimoda et al. | 400/76 |
| 7,381,000 | B2* | 6/2008 | Shimoda et al. | 400/76 |
| 7,527,829 | B2* | 5/2009 | Yoshida et al. | 427/384 |
| 7,746,541 | B2* | 6/2010 | Cernasov | 359/296 |
| 8,018,643 | B2* | 9/2011 | Ho et al. | 359/296 |
| 8,081,375 | B2* | 12/2011 | Komatsu et al. | 359/296 |

\* cited by examiner

*Primary Examiner* — Loha Ben
(74) *Attorney, Agent, or Firm* — Li & Cai Intellectual Property (USA) Office

(57) ABSTRACT

A display element, a display apparatus and a fabricating method of a display element are provided. The display apparatus includes a first substrate, a second substrate and a display medium layer. The display medium layer is disposed between a first electrode layer of the first substrate and a second electrode layer of the second substrate. The display medium layer has a plurality of display elements. Each display element includes a colorized capsule, a fluid and a plurality of particles. The fluid and the particles are disposed in the colorized capsule, and the particles are charged. The fabricating method of a display element is coloring a capsule of a display element with dye to form a colorized capsule.

17 Claims, 4 Drawing Sheets

DISPLAY ELEMENT, DISPLAY APPARATUS AND FABRICATING METHOD OF THE DISPLAY ELEMENT

BACKGROUND OF THE DISCLOSURE

1. Technical Field

The present disclosure relates to a display element, a display apparatus and a method of fabricating a display element. More particularly, the present disclosure relates to a color display element, a color display apparatus and a method of fabricating a color display element.

2. Description of Related Art

The electronic book is one of the products which are most talked about in the market. The advantages of the electronic book include lightweight, thin thickness and low power consuming. Further, it is easy to be carried and possesses environmental consciousness. Currently, most of the electronic books use the technology of electronic ink. The electronic ink is mainly comprised of a plurality of microcapsules. Each of the microcapsules is a transparent capsule enclosing black particles, white particles and a transparent electrophoresis solution. The electric charge type of the charges carried by the black particles is different from the electric charge type of the charges carried by the white particles. Thus, with the changes of the applied electric field, the black particles and the white particles migrate along different directions in the transparent capsule. According to the color of the particles close to the user in the capsules at different locations of the electronic book, it displays a black-and-white frame.

However, the aforementioned method only makes the electronic book displaying the black-and-white frame and further limits the application range of the electronic ink. Currently, the color filter is additionally used in the electronic book to achieve the effect of the color display. However, the use of the color filter increases the manufacturing cost and decreases the brightness of the electronic book.

SUMMARY OF THE INVENTION

The display element of one embodiment of the disclosure includes a colorized capsule, a fluid, and a plurality of particles. The fluid and the particles are disposed in the colorized capsule and the particles are charged particles.

The display apparatus of one embodiment of the disclosure includes a first substrate, a second substrate and a display medium layer. The display medium layer is disposed between a first electrode layer of the first substrate and a second electrode layer of the second substrate. The display medium layer has a plurality of aforementioned display elements.

The method for fabricating the display element of one embodiment of the disclosure includes the following steps. A plurality of display element semi-products is provided. Each of the display element semi-products includes a capsule, a fluid and a plurality of particles. The fluid and the particles are disposed in the capsule and the particles are charged particles. The capsules of the display element semi-products are dyed with a dye to be a plurality of colorized capsules.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF THE PREFERRED EMBODIMENTS

Figure 1:
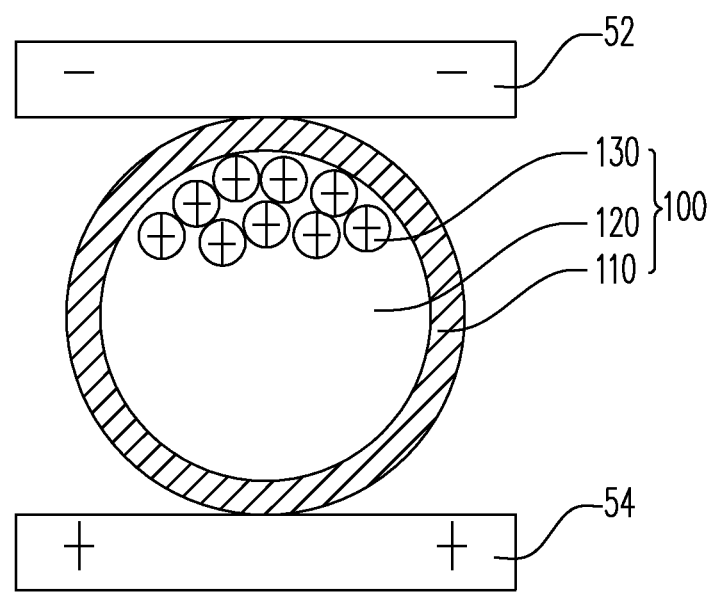
FIG. 1 is a schematic view of a display element according to one embodiment of the present disclosure.

FIG. 1 is a schematic view of a display element according to one embodiment of the present disclosure. As shown in FIG. 1, the display element 100 of the present embodiment includes a colorized capsule 110, a fluid 120 and a plurality of particles 130. In the present embodiment, the fluid 120 can be a transparent fluid. The particles 130 further include a plurality of first particles 130. The first particles 130 carry a first charge and have a first color. The first color can be, for example but not limited to, white. The fluid 120 and the white particles 130 are disposed in the colorized capsule 110 and the white particles 130 are charged particles.

When the display element 100 is operated to display frames, two electrodes 52 and 54 are respectively disposed on the top and the bottom of the display element 100. In the present embodiment, the white particles carrying positive charges are taken as an example. When the electrode 52 carries the negative charges and the electrode 54 carries the positive charges, the white particles 130 are attracted by the electrode 52 and migrate to one side of the colorized capsule near the electrode 52. When viewing the display element 100 from the electrode 52, the user can clearly perceive the color of the colorized capsule 110 since the white particles 130 set off the color of the colorized capsule 110. For instance, if the color of the colorized capsule is blue while the electrode 52 carries the negative charges and the electrode 54 carries the positive charges, the user can perceive the blue color with a relatively high brightness from the electrode 52. On the other hand, when the electrode 52 carries the positive charges and the electrode 54 carries the negative charges, the white particles 130 are attracted by the electrode 54 and migrate to one side of the colorized capsule 110 near the electrode 54. Thus, the user can perceive the blue color even the black color with a relatively low brightness from the electrode 52.

In the display element 100 of the present embodiment, since the fluid 120 and the white particles 130 are as same as the fluid and the particles used in the typical electronic ink technology, it is not necessary to particularly adjust the specific gravity of the fluid 120 and the white particles 130 or other material properties of the fluid 120 and the white particles 130. Thus, the manufacturing cost is decreased. For instance, in order to obtain a relatively fast response and a relatively high display quality, it is preferred to adjust the specific gravity of the white particles 130 to be substantially equal to the specific gravity of the fluid 120. However, if the material of the fluid 120 and the material of the white particles 130 are changed, it is necessary to carefully adjust the specific gravity of the fluid 120 and the specific gravity of the white particles 130. It should be noticed that, in the present embodiment, the display element 100 uses colorized capsule 110 to achieve the purpose of color display. Thus, there is no such problem of adjusting the specific gravity of the fluid and the particles. Moreover, in the present embodiment, the display element 100 can display the color without using the color filter. Hence, the cost of the assembly and the material of the color filter can be saved. Further, the decreasing of the brightness of the light incident into the display element due to the light passing through the color filter does not happen.

A color of the colorized capsule 110 of the present embodiment can be red, green, blue or other proper color. The colorized capsule 110 of the present embodiment includes a main body and a dye adhering on the main body. Since the bonding between the main body and the dye is the bonding between the molecules, FIG. 1 which is a macroscopic scale point of view of the display element cannot clearly reveal the bonding between the main body and the dye. The main body is made of urea formaldehyde resin or other proper material. Moreover, it is preferred to choose the dye having the properties of high absorbance, high saturation, good thermal stability, good acid-base stability, high water solubility and low organic solubility. Additionally, when the main body is made of urea formaldehyde resin, the molecular structure of the dye preferably includes nitrogen/oxygen/chloride atoms so that the hydrogen bonding force between the urea formaldehyde resin and the dye is increased. Thus, a relatively better colorizing result can be obtained. The green dye can be the phthalocyanine green or other proper green dyes. The molecular formula of the phthalocyanine green is shown as following:

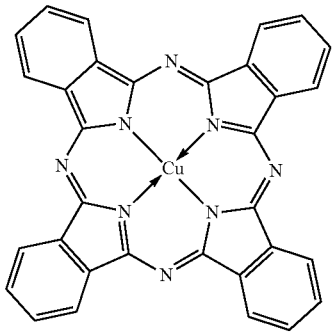

The blue dye can be the phthalocyanine blue or other proper blue dyes. The molecular formula of the phthalocyanine blue is shown as following:

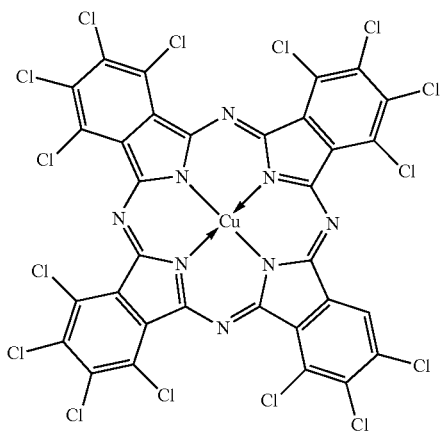

The red dye can be the diazo-derivatives, quinoline-derivatives or other proper red dyes. The molecular formula of 1-((4-methyl-2-nitrophenyl)diazenyl)naphthalen-2-ol which is one of the diazo-derivatives is shown as following:

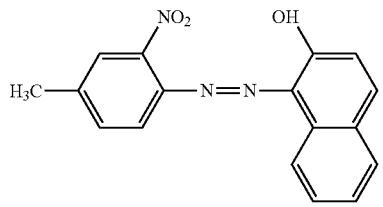 [SMILES: Cc1ccc(N=Nc2c(O)ccc3ccccc23)c([N+](=O)[O-])c1]

The molecular formula of Quinolino[2,3-b]acridine-7,14 (5H,12H)-dione which is one of the exemplars of quinoline-derivatives is shown as following:

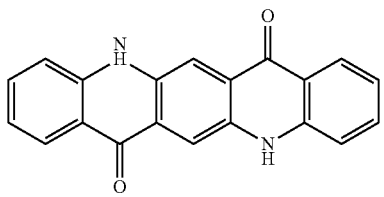 [SMILES: O=c1c2ccccc2[nH]c2cc3c(=O)c4ccccc4[nH]c3cc12]

Figure 2:
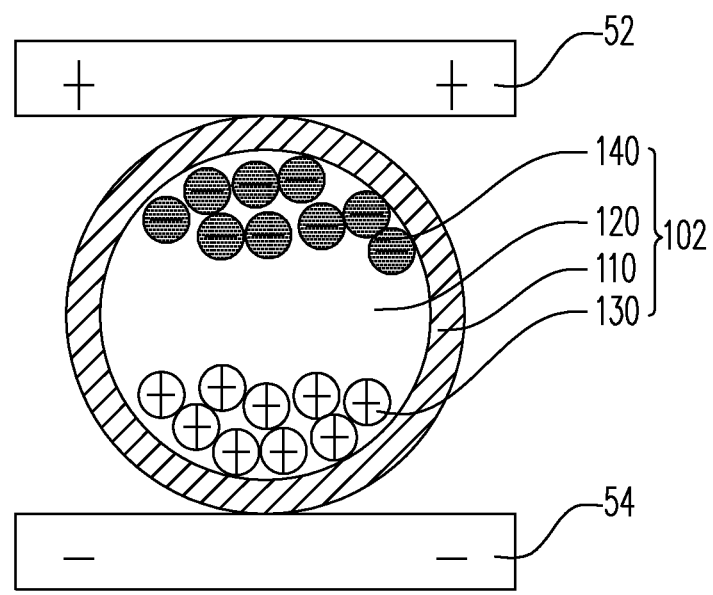
FIG. 2 is a schematic view of a display element according to another embodiment of the present disclosure.

FIG. 2 is a schematic view of a display element according to another embodiment of the present disclosure. As shown in FIG. 2, the display element 102 of the present embodiment is similar to the display element 100. The display element 102 of the present embodiment is different from the display element 100 in that the display element 102 further includes a plurality of second particles 140. The second particles 140 carry a second charge and have a second color. The color of the second particles 140 can be black and are disposed in the colorized capsule 110. The charge carried by the white particles 130 is different from the charge carried by the black particles 140. For instance, the white particles 130 carry the positive charge and the black particles 40 carry the negative charge. When the electrode 52 carries the positive charge and the electrode 54 carries the negative charge, the white particles 130 are attracted by the electrode 54 and migrate to one side of the colorized capsule 110 near the electrode 54. Moreover, the black particles 140 are attracted by the electrode 52 and migrate to another side of the colorized capsule 110 near the electrode 52. When viewing the display element 100 from the electrode 52, the user perceives black color since the external incident light is absorbed by the black particles 140. On the other hand, when the electrode 52 carries the negative charge and the electrode 54 carries the positive charge, the white particles 130 are attracted by the electrode 52 and migrate to one side of the colorized capsule 110 near the electrode 52. When viewing the display element 100 from the electrode 52, the user perceives the color of the colorized capsule 110 set off by the white particles 130. By placing the black particles 140 in the colorized capsule 110, the display element 120 reveals a relatively better display contrast. The black particles 140 of the present embodiment are made of carbon or other proper material, and the white particles 130 of the present embodiment can be made of titanium oxide or other proper material. Further, the fluid 120 can be an electrophoresis solution or other proper liquid.

Figure 3:
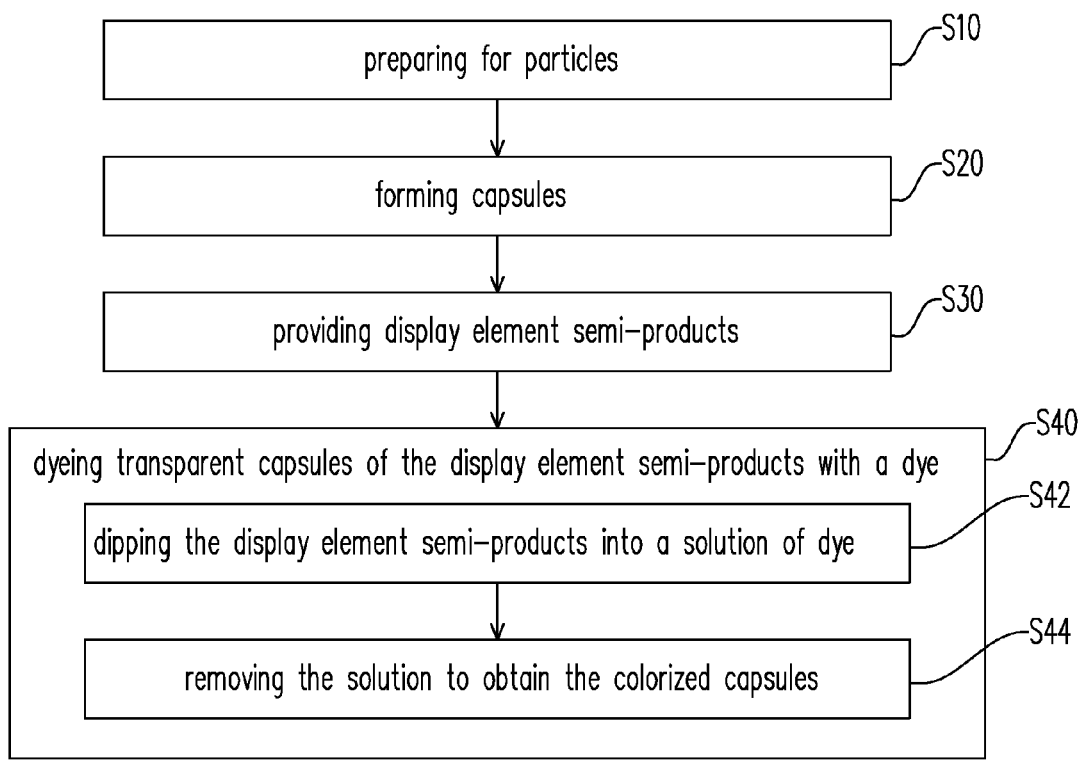
FIG. 3 is a flow chart illustrating a method for fabricating a display element according to one embodiment of the present disclosure.

FIG. 3 is flow chart illustrating a method for fabricating a display element according to one embodiment of the present disclosure. As shown in FIG. 3, in the present embodiment, the method for forming the display element includes following steps. In step S30, a plurality of display element semi-products is provided. The display element semi-products are similar to the display element 100 shown in FIG. 1. The display element semi-products are different from the display element 100 in that the capsules of the display element semi-products are transparent capsules without being dyed. Then, the transparent capsules of the display element semi-products are dyed with a dye to be the colorized capsule 110 as shown in FIG. 1.

As for the step of manufacturing the display element semi-products, the white particles 130 shown in FIG. 1 are prepared in advance (step S10). The method for preparing the particles includes milling the original material into the particles with nanometer level size. Furthermore, while the display element 102 shown in FIG. 2 is manufactured, it is necessary to prepare the black particles 140 shown in FIG. 2. Then, the prepared particles and the fluid 120 shown in FIG. 1 are enclosed by the transparent capsules made of urea formaldehyde resin. Therefore, the manufacturing of the display element semi-products is done.

In the step S40 for dyeing the transparent capsule with the dye, the display element semi-products can be dipped into a solution of the dye in advance (step S42). For instance, the display element semi-products are dipped into the solution having the dye with the concentration of about 1 mole for about 5 minutes. After the capsules are dyed with the dye, the solution is removed to obtain the display elements 100 having the colorized capsules 110 shown in FIG. 1 (step S44). After the colorized capsules are obtained by filtering out the solution, the purify process can be optionally implemented on the colorized capsules to obtain the display elements with relatively better quality.

Figure 4:
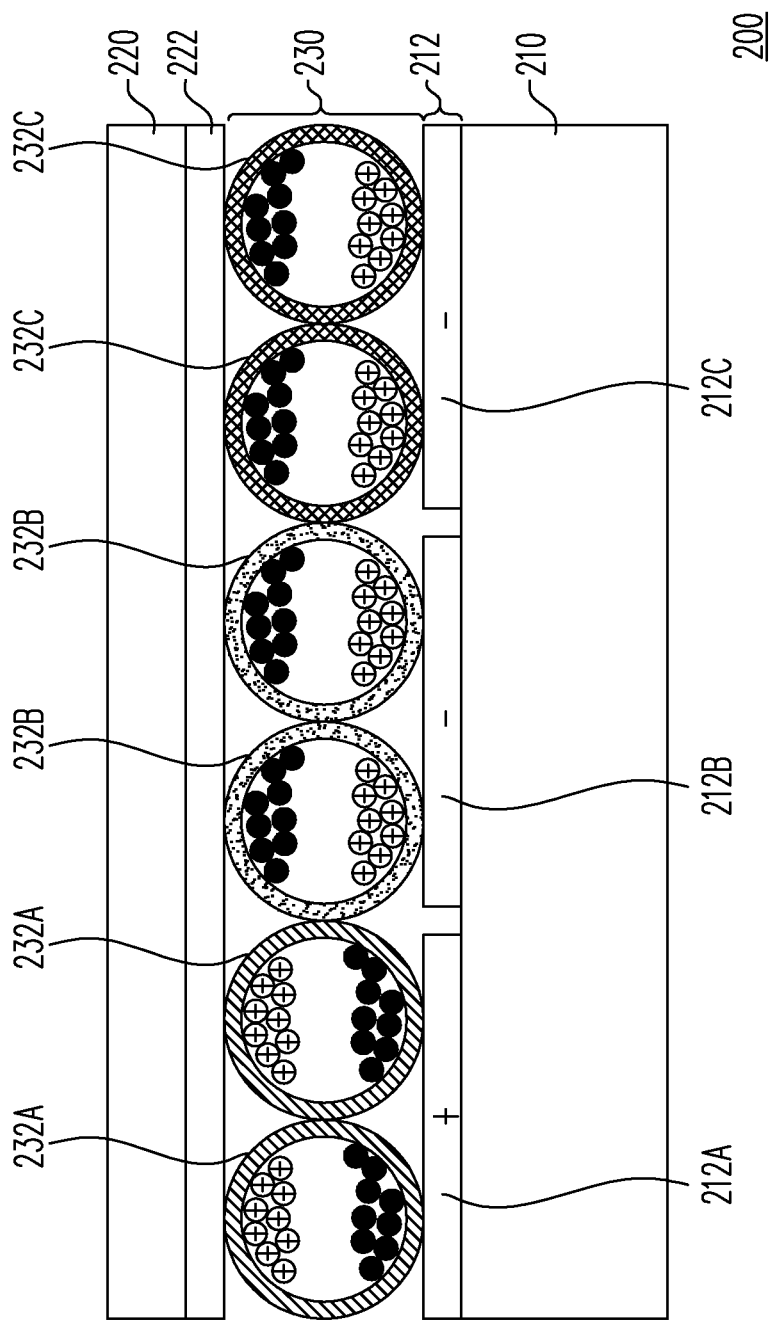
FIG. 4 is a schematic view of a display apparatus according to one embodiment of the present disclosure.

FIG. 4 is a schematic view of a display apparatus according to one embodiment of the present disclosure. As shown in FIG. 4, the display apparatus 200 of the present embodiment includes a first substrate 210, a second substrate 220 and a display medium layer 230. The display medium layer 230 is disposed between a first electrode layer 212 of the first substrate 210 and a second electrode layer 222 of the second substrate 220. The display medium layer 230 has a plurality of display elements 232A, 232B and 232C. The display elements 232A, 232B and 232C of the present embodiment are similar to the display element 102 shown in FIG. 2. However, the display elements 232A, 232B and 232C can be the display element 100 shown in FIG. 1 or other display element which meets the concept of the present disclosure. By changing the direction of the electric field applied between the first electrode layer 212 and the second electrode layer 222, the statuses of the display elements 232A, 232B and 232C distributed in the display medium layer 230 are changed and the purpose for displaying image can be achieved.

Since the display elements 232A, 232B and 232C use colorized capsules to achieve the purpose of color display, it is not necessary to use the color filter in color display. Thus, the cost of the assembly and the material of the color filter can be saved. Further, the decreasing of the brightness of the light incident into the display element due to the light passing through the color filter does not happen.

The first substrate 210 can be, for example, an active device array substrate. That is, the first electrode layer 212 includes a plurality of pixel electrodes 212A, 212B and 212C which are separated from each other. By individually changing the direction of the electric field between the pixel electrode 212A and the second electrode layer 222, the direction of the electric field between the pixel electrode 212B and the second electrode layer 222 and the direction of the electric field between the pixel electrode 212C and the second electrode layer 222, the display elements 232A, 232B and 232C respectively on the pixel electrodes 212A, 212B and 212C appear in different statuses. For instance, when the color of the colorized capsule of the display element 232A is red and the white particles in the colorized capsule of the display element 232A are close to the second electrode layer 222, the user perceives red display element 232A from the second electrode layer 222. When the colors of the colorized capsules of the display elements 232B and 232C are green and blue respectively and the black particles in the colorized capsules of the display elements 232B and 232C are close to the second electrode layer 222, the user perceives black display elements 232B and 232C from the second electrode layer 222. By using the aforementioned method, the purpose of color display can be achieved. Further, according to the product position of the display apparatus, the display apparatus 200 can be those display apparatuses driven by a passive driving method to decrease the cost.

Altogether, in the display element, the display apparatus and the method for fabricating the display element of the present disclosure, since the display element is dyed, the purpose of color display can be achieved. By comparing with the typical technology using the color filter, the manufacturing cost of the display element and the display apparatus of the embodiment of the present disclosure is decreased and the displaying quality of the display element and the display apparatus of the embodiment of the present disclosure is improved.

It will be apparent to those skilled in the art that various modifications and variations can be made to the structure of the present disclosure without departing from the scope or spirit of the disclosure. In view of the foregoing descriptions, it is intended that the present disclosure covers modifications and variations of this disclosure if they fall within the scope of the following claims and their equivalents.

What is claimed is:

1. A display element, comprising:
    a colorized capsule comprising a main body and a dye adhering on the main body, wherein the main body is made of urea formaldehyde resin;
    a fluid disposed in the colorized capsule; and
    a plurality of particles disposed in the colorized capsule, wherein the particles are charged particles.

2. The display element of claim 1, wherein the particles comprise a plurality of first particles, and wherein the first particles carry a first charge and have a first color.

3. The display element of claim 2, wherein the first color of the first particles is white.

4. The display element of claim 2, wherein the particles further comprise a plurality of second particles, the second particles carry a second charge and have a second color, an electric charge type of the first charge is opposite to an electric charge type of the second charge, and wherein the first color is different from the second color.

5. The display element of claim 4, wherein the first color is white and the second color is black.

6. The display element of claim 1, wherein a color of the colorized capsule is red, green or blue.

7. The display element of claim 1, wherein the dye is phthalocyanine green, phthalocyanine blue, diazo-derivatives or quinoline-derivatives.

8. A display apparatus, comprising:
    a first substrate having a first electrode layer;
    a second substrate having a second electrode layer; and a display medium layer disposed between the first electrode layer and the second electrode layer, wherein the display medium layer has a plurality of display elements and each of the display elements comprises:
a colorized capsule comprising a main body and a dye adhering on the main body, wherein the main body is made of urea formaldehyde resin;
a fluid disposed in the colorized capsule; and
a plurality of particles disposed in the colorized capsule, wherein the particles are charged particles.

9. The display apparatus of claim 8, wherein the particles comprise a plurality of first particles, and wherein the first particles carry a first charge and have a first color.

10. The display apparatus of claim 9, wherein the first color of the first particles is white.

11. The display apparatus of claim 9, wherein the particles further comprise a plurality of second particles, the second particles carry a second charge and have a second color, an electric charge type of the first charge is opposite to an electric charge type of the second charge, and wherein the first color is different from the second color.

12. The display apparatus of claim 11, wherein the first color is white and the second color is black.

13. The display apparatus of claim 8, wherein a color of the colorized capsule is red, green or blue.

14. The display apparatus of claim 8, wherein the dye is phthalocyanine green, phthalocyanine blue, diazo-derivatives or quinoline-derivatives.

15. The display apparatus of claim 8, wherein the first substrate is an active device array substrate.

16. A method for fabricating a display element, comprising the steps of:
providing a plurality of display element semi-products, wherein each of the display element semi-products comprises a capsule, a fluid and a plurality of particles, the fluid and the particles are disposed in the capsule, and the particles are charged particles; and
dyeing the capsules of the display element semi-products by dipping the capsules of display element semi-products into a solution of a dye to be a plurality of colorized capsules, wherein each capsule comprises a capsule body made of urea formaldehyde resin.

17. The method of claim 16, wherein the step of dyeing the capsule with the dye further comprises:
after the capsules are dyed with the dye, removing the solution to obtain the colorized capsules.

* * * * *